United States Patent
Chun et al.

(10) Patent No.: US 8,553,818 B2
(45) Date of Patent: Oct. 8, 2013

(54) METHOD FOR DETERMINING MODULATION AND CODING SCHEME

(75) Inventors: Jin Young Chun, Anyang-si (KR); Bin Chul Ihm, Anyang-si (KR); Inkyu Lee, Seoul (KR); Sung Hyun Moon, Seoul (KR); Chang Kyung Sung, Seoul (KR)

(73) Assignee: LG Electronics Inc., Seoul (KR)

( * ) Notice: Subject to any disclaimer, the term of this patent is extended or adjusted under 35 U.S.C. 154(b) by 879 days.

(21) Appl. No.: 12/311,625

(22) PCT Filed: Nov. 2, 2007

(86) PCT No.: PCT/KR2007/005520
§ 371 (c)(1),
(2), (4) Date: Dec. 24, 2009

(87) PCT Pub. No.: WO2008/054172
PCT Pub. Date: May 8, 2008

(65) Prior Publication Data
US 2010/0278225 A1  Nov. 4, 2010

(30) Foreign Application Priority Data

Nov. 2, 2006  (KR) .................. 10-2006-0107644
Nov. 2, 2006  (KR) .................. 10-2006-0107653

(51) Int. Cl.
*H04L 1/02* (2006.01)
*H04B 1/00* (2006.01)

(52) U.S. Cl.
USPC .......................... 375/347; 375/130

(58) Field of Classification Search
USPC .......... 375/347, 130, 260, 343; 370/252, 328, 370/332, 342, 335; 455/226.1, 550.1; 725/751
See application file for complete search history.

(56) References Cited

U.S. PATENT DOCUMENTS

| | | | |
|---|---|---|---|
| 7,386,277 B2* | 6/2008 | Cho et al. ................ | 455/69 |
| 2002/0080719 A1* | 6/2002 | Parkvall et al. .......... | 370/235 |
| 2003/0063587 A1* | 4/2003 | Cho et al. ................ | 370/335 |
| 2004/0081248 A1 | 4/2004 | Parolari | |
| 2004/0196919 A1* | 10/2004 | Mehta et al. ............. | 375/267 |
| 2004/0264588 A1* | 12/2004 | Song et al. .............. | 375/260 |
| 2005/0053038 A1 | 3/2005 | Kimura | |
| 2006/0233272 A1* | 10/2006 | Raghavan et al. ........ | 375/260 |
| 2008/0192683 A1* | 8/2008 | Han et al. ............... | 370/329 |

FOREIGN PATENT DOCUMENTS

JP  2004-040314  2/2004

OTHER PUBLICATIONS

Symbol Based Rate Adaption in Coded MIMO-OFDM Systems, Abstract.
Chang Kyung Sung et al., "Symbol Based Rate Adaption in Coded MIMO-OFDM Systems", School of Electrical Engineering, Korea University, Seoul, Korea, 2006 IEEE.
Symbol Based Rate Adaption in Coded MIMO-OFDM Systems, Abstract, May 2006.

* cited by examiner

*Primary Examiner* — Khai Tran
(74) *Attorney, Agent, or Firm* — McKenna Long & Aldridge LLP

(57) ABSTRACT

There is provided a method of determining a Modulation and Coding Scheme (MCS). The method includes predicting an error rate of a symbol and determining a MCS of the symbol using the error rate. Since a MCS level is determined using an estimated error rate and user data is scheduled, multi-user diversity gain can be obtained and the transmission rate can be improved.

7 Claims, 6 Drawing Sheets

METHOD FOR DETERMINING MODULATION AND CODING SCHEME

This application claims the benefit of PCT/KR2007/005520 filed on Nov. 2, 2007, and Korean Patent Application Nos. 10-2006-0107644 and 10-2006-0107653 both filed on Nov. 2, 2006, the contents of which are hereby incorporated herein by reference for all purposes in their entirety.

TECHNICAL FIELD

The present invention relates to wireless communication and more particularly, to a method of compensating for channel error due to user's mobility in a wireless communication system.

BACKGROUND ART

In a current wireless communication system, a variety of methods aiming at high-quality and high-capacity data transmission by employing limited frequency resources have emerged. Further, for the purpose of this high-peed multimedia data transmission, there is an increasing need for an effective countermeasure with respect to a fading phenomenon occurring in a wireless channel.

In recent years, a variety of researches have been done into Multiple Input Multiple Output (MIMO) technique employing multiple antennas, which will be applied to the next-generation mobile communication system for ultra-high speed multimedia data transmission, and Orthogonal Frequency Division Multiplexing (OFDM) technique that can efficiently cope with a frequency selectivity of a channel.

Spatial Division Multiplexing (SDM) scheme is an example of the MIMO technique. A transmitter transmits different data through respective transmit antennas, and a receiver identifies the data through proper signal processing such as interference removal and diversity technique. As the number of the transmit antennas and the number of the receive antennas are increased, the channel capacity increases linearly. Thus, multiple antenna technique is an indispensable research subject for a current wireless communication system requiring a high transmission rate.

In order to effectively transmit high-speed data, inter-symbol interference occurring at the time of high-speed transmission or frequency selective fading occurring due to multiple path interference must be overcome. The OFDM scheme can be used to effectively remove the frequency selective property of a channel. Furthermore, spectral efficiency can be increased by the use of multiple carriers having a mutual orthogonality, and a modulation process at a transmitter and a demodulation process at a receiver can be implemented at high speed by using Inverse Fast Fourier Transform (IFFT) and Fast Fourier Transform (FFT).

A closed-loop system for providing a feedback channel from a receiver to a transmitter has been developed to improve the performance of the system. When Channel State Information (hereinafter, referred to as 'CSI') is fed back to the transmitter, the transmitter can control several system parameters using this information, resulting in a maximized performance.

However, transmitting the CSI for the entire channels can be increase signaling overhead and user mobility can degrade accuracy of the CSI. Therefore, there is a need for a criterion for determining a Modulation and Coding Scheme (hereinafter, referred to as 'MCS') under high user mobility.

An Adaptive Modulation and Coding (hereinafter, referred to as 'AMC') scheme is a technique for increasing the link performance by controlling a transmission power level, a modulation level and/or a code rate in a transmitter using current CSI. When the channel state is good, the data transmission rate is increased, and when the channel state is not good, the transmission rate is decreased in order to support efficient transmission. Consequently, a mean transmission rate can be increased.

The AMC scheme can be used to optimize the data transmission on the basis of accurate CSI. If CSI used in a transmitter does not exactly match that used in a receiver, the AMC scheme experiences severe performance degradation. If channel error is very great, the performance of the AMC scheme can be lower than that of an open-loop transmission system. In a wireless communication system, user mobility is one of main reason for the channel error. To provide high-capacity and high-quality services under high user mobility, a method of minimizing performance degradation of the AMC scheme is needed.

In a cellular system, many users exist within one cell. A performance gain can be obtained by supplying information to a number of users having different channel gain values at an appropriate time. This is called a multi-user diversity gain. Furthermore, the performance of the system can be increased by applying the AMC scheme on a user basis. Accordingly, there is a need for a method of determining MCS for multiple users and efficiently scheduling the respective users based on the MCS, thus increasing a multi-user diversity gain.

DISCLOSURE OF INVENTION

Technical Problem

An object of the present invention is to provide a method of compensating for channel error due to user mobility.

Another object of the present invention is to provide a method of determining a modulation and coding scheme depending on channel state.

Still another object of the present invention is to provide a method of selecting user data depending on channel state.

Technical Solution

In one aspect, there is provided a method of determining a Modulation and Coding Scheme (MCS). The method includes predicting an error rate of a symbol and determining a MCS of the symbol using the error rate.

In another aspect, there is provided a method of determining a MCS. The method includes predicting an error rate of a symbol with respect to each predetermined MCS by employing a channel correlation coefficient considering user mobility and selecting a MCS having the maximum spectral efficiency with respect to the error rate.

In still another aspect; there is provided a method of scheduling a plurality of user data. The method includes obtaining a transmission rate and an error rate supported for a plurality of transmit antennas, selecting user data by using the error rate and the transmission rate and modulating and coding the user data based on a MCS decided according to the transmission rate and transmitting the user data.

Advantageous Effects

Spectral efficiency can be improved by compensating for channel error. Performance degradation of the AMC scheme can be prevented. Since a MCS level is determined using an estimated error rate and user data is scheduled, multi-user diversity gain can be obtained and the transmission rate can be improved.

MODE FOR THE INVENTION

Figure 1:
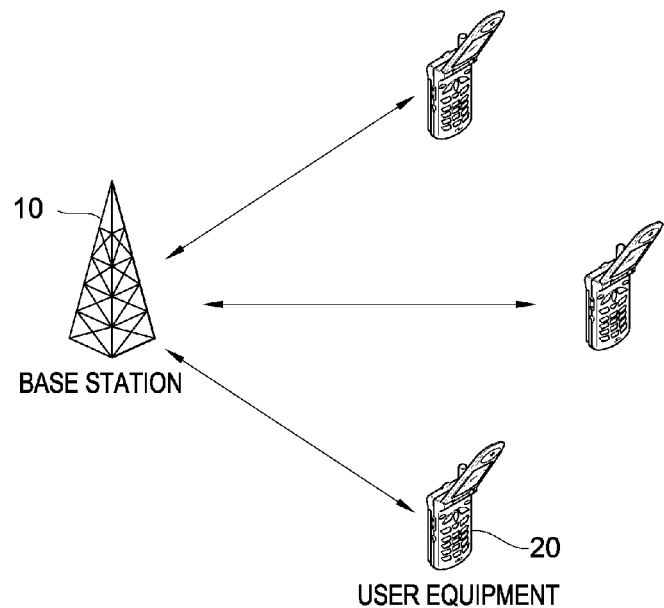
FIG. 1 is an exemplary view illustrating a mobile communication system.

FIG. 1 is an exemplary view illustrating a mobile communication system.

Referring to FIG. 1, a mobile communication system includes a base station (BS) 10, and a user equipment (UE) 20. The mobile communication system is widely deployed in order to provide a variety of communication services such as voice and packet data.

The base station 10 generally refers to a fixed station that communicats with the user equipment 20, and may also be referred to as other terminologies, such as node-B, a base transceiver system (BTS) and an access point.

The user equipment 20 may be fixed or have mobility, and may also be referred to as other terminologies, such as a mobile station MS, a user terminal UT, a subscriber station SS and a wireless device.

Hereinafter, downlink refers to communication from the base station 10 to the user equipment 20, and uplink refers to communication from the user equipment 20 to the base station 10. In downlink, a transmitter may be part of the base station 10, and a receiver may be part of the user equipment 20. To the contrary, in uplink, a transmitter may be part of the user equipment 20, and a receiver may be part of the base station 10. The base station 10 may include a plurality of receivers and a plurality of transmitters, and the user equipment 20 may include a plurality of receivers and a plurality of transmitters.

Figure 2:
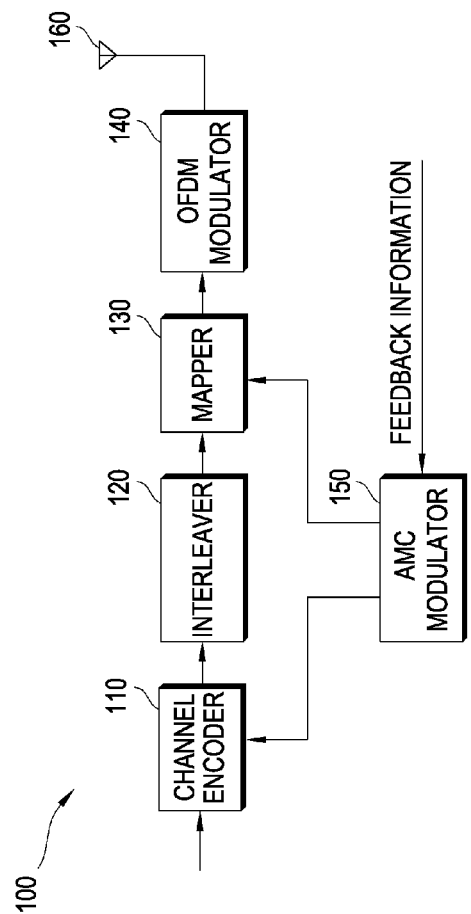
FIG. 2 is a block diagram of a transmitter according to an embodiment of the present invention.

FIG. 2 is a block diagram of a transmitter according to an embodiment of the present invention.

Referring to FIG. 2, a transmitter 100 includes a channel encoder 110, an interleaver 120, a mapper 130, an OFDM modulator 140 and an AMC controller 150.

The channel encoder 110 encodes input information bits according to a coding scheme decided by the AMC controller 150 and forms coded data. The channel encoder 110 can add error detection bits, such as cyclic redundancy check (CRC), to information bits, and add extra codes for error correction. The error correction code may be, for example, a convolutional code or a turbo code.

The interleaver 120 interleaves the coded data in order to reduce a noise effect coming from the channel.

The mapper 130 modulates the interleaved data according to a modulation scheme decided by the AMC controller 150, and provides modulation symbols. The coded data are mapped to modulation symbols, which represent points according to amplitude and phase constellation, by the mapper 130. A modulation scheme may be m-quadrature phase shift keying (m-PSK) or m-quadrature amplitude modulation (m-QAM). For example, the m-PSK may include not only QPSK, but also BPSK or 8-PSK. The m-QAM may include not only 16-QAM or 64-QAM, but also 256-QAM.

The OFDM modulator 140 transforms input symbols into an OFDM symbol. The OFDM modulator 140 can transform the input symbols into time domain samples by performing IFFT on the input symbols. To the time domain samples may be added a cyclic prefix (CP). The OFDM symbol output from the OFDM modulator 140 is transformed into an analog signal and then transmitted through the antenna 160.

The AMC controller 150 decides a modulation scheme and a coding scheme based on feedback information received from a receiver (200 of FIG. 3), and transfers them to the channel encoder 110 and the mapper 130. In an embodiment, the feedback information may include a MCS index. At this time, the AMC controller 150 can decide a MCS corresponding to the MCS index through a MCS table stored in memory (not shown). The MCS table may be a look-up table in which a modulation scheme and a coding scheme are defined according to a MCS index. In another embodiment, the feedback information may be channel information. At this time, the AMC controller 150 can decide a MCS based on the channel information according to a MCS decision method to be described later on.

Figure 3:
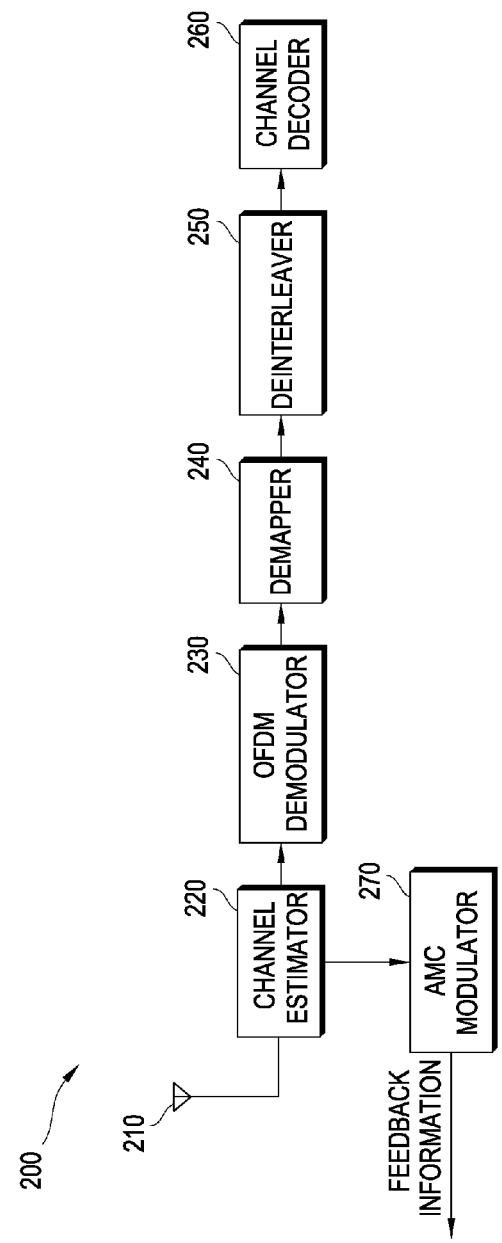
FIG. 3 is a block diagram of a receiver according to an embodiment of the present invention.

FIG. 3 is a block diagram of a receiver according to an embodiment of the present invention.

Referring to FIG. 3, a receiver 200 includes a channel estimator 220, an OFDM demodulator 230, a demapper 240, a deinterleaver 250, a channel decoder 260 and an AMC controller 270.

A signal received from a receive antenna 210 is digitalized. The channel estimator 220 estimates channel information from the received signal. The signal is transformed into frequency domain symbols by the OFDM demodulator 230. The OFDM demodulator 230 removes a CP from the input signal and can perform FFT on the signal. The demapper 240, the deinterleaver 250 and the channel decoder 260 perform reverse processes of the signal processing schemes on a corresponding stream, which have been performed in the channel encoder 110, the interleaver 120 and the mapper 130 of the transmitter 100. In other words, the demapper 240 performs demapping on the signals output from the OFDM demodulator 120, and outputs a Log Likelihood Ratio (LLR) signal of a bit unit. The deinterleaver 250 performs deinterleaving on the signal output from the demapper 240. The channel decoder 260 decodes the signal output from the deinterleaver 250 and outputs original data.

The AMC controller 270 decides a MCS level in consideration of channel information and user mobility estimated in the channel estimator 220. The AMC controller 270 sends the decided MCS level to the transmitter 100 through a feedback channel using an index of the MCS level as feedback information.

A method of deciding a MCS is described below.

It is assumed that the receiver 200 exactly knows channel information. A zero average complex value-based baseband signal model and a discrete time frequency selective fading OFDM channel model are taken into consideration.

In order to decide the MCS level, the AMC controller 270 of the receiver 200 first performs error rate prediction of an OFDM symbol unit. Hereinafter, the error rate is a bit error rate. However, the technical spirit of the present invention may also be applied to a frame error rate or a block error rate. After the error rate of a symbol is predicted with respect to each MCS level, the maximum spectral efficiency to fulfill a predetermined Quality of Service (QoS) condition is decided, and a MCS index corresponding to the maximum spectral efficiency is sent to the transmitter 100.

An instant error rate of an OFDM symbol can be estimated as shown

MathFigure 1

$$\overline{BER} = \frac{1}{p}\sum_{d=d_H}^{d_H+5} N(d)P(d,H) \quad \text{[Math. 1]}$$

where $\overline{BER}$ is the error rate of a symbol, p is a puncturing period, $d_H$ is a minimum Hamming distance of a code, N(d) is a total number of error events having a Hamming distance d, and P(d,H) is Pairwise Error Probability (PEP) between codewords at the Hamming distance d.

In order to predict an accurate error rate in the AMC controller 270, the PEP of a system must be analyzed first. In order to reduce complexity for calculating PEP P(d,H), the entire subchannels must use a fixed modulation order having the amount of $M=2^m$, where m is an integer.

Assuming gray mapping, the bound of PEP P(d,H) can be simplified as shown

MathFigure 2

$$P(d,H) \le m^{-d} \sum_{\underline{S}} 2^{-(m-1)} \sum_{\underline{x}\in\chi_{\underline{c}}^{\underline{S}}} \sum_{\underline{v}\in\chi_{\underline{c}}^{\underline{S}}} P(\underline{x}\to\underline{v}\mid\tilde{H}) \quad \text{[Math. 2]}$$

where m indicates a constellation size, $\underline{S}$ indicates a Cartesian product between d bit positions, $$\chi_{\underline{c}}^{\underline{S}},$$
$$\chi^{\underline{S}}_{\overline{c}}$$

indicates a Cartesian product sequence between the first d bits of codewords $\underline{c}$, $\overline{c}$ and $\tilde{H}=[H_{n_1},\ldots,H_{n_d}]$ is a channel vector selected by $\underline{S}$.

If the formula is further developed through the assumption of gray mapping and an ideal interleaver, the PEP bound P(d,H) can be expressed as shown MathFigure 3

$$P(d,H) \le \quad \text{[Math. 3]}$$

$$m^{-d}\sum_{\underline{S}}\prod_{k=1}^{d} 2^{-(m-1)} \sum_{x_k\in\chi_0^{ik}}\sum_{v_k\in\chi_1^{ik}} P(x_k\to v_k\mid H_{n_k}) =$$

$$E_H\left[\prod_{k=1}^{d}\sum_{i=1}^{m}\frac{1}{m2^{m-1}}\sum_{x_k\in\chi_0^{ik}}\sum_{v_k\in\chi_1^{ik}} P(x_k\to v_k\mid H_{n_k})\right] \equiv$$

$$\overline{B}_M(H)$$

-continued

MathFigure 4

$$\overline{B}_M(H) = \quad \text{[Math. 4]}$$

$$\prod_{k=1}^{d} E_{H_k}\left[\frac{1}{m2^{m-1}}\sum_{i=1}^{m}\sum_{x_k\in\chi_0^{ik}}\sum_{v_k\in\chi_1^{ik}} P(x_k\to v_k\mid H_{n_k})\right] =$$

$$\left\{E_{H_k}\left[\sum_{k=1}^{N}\frac{1}{m2^{m-1}}\sum_{i=1}^{m}\sum_{x_k\in\chi_0^{ik}}\sum_{v_k\in\chi_1^{ik}} P(x_k\to v_k\mid H_{n_k})\right]\right\}^d =$$

$$\left\{\frac{1}{N}\sum_{k=1}^{N}\frac{1}{m2^{m-1}}\sum_{i=1}^{m}\sum_{x_k\in\chi_0^{ik}}\sum_{v_k\in\chi_1^{ik}} P(x_k\to v_k\mid H_{n_k})\right\}^d \equiv$$

$$\left\{\frac{1}{N}\sum_{k=1}^{N} B_M(H_k)\right\}^d$$

where N is the number of subcarriers.

A symbol shift probability $P(x_k\to v_k|H_k)$ can be expressed as shown

MathFigure 5

$$P(x_k\to v_k\mid H_k) = Q\left(\sqrt{\frac{|H_k|^2|x_k-v_k|^2}{4\sigma^2}}\right) \quad \text{[Math. 5]}$$

where Q(x) can be defined as $$\frac{1}{\sqrt{2\pi}}\int_x^\infty e^{-2z^2/2}dz.$$

Q(x) can be simplified as shown

MathFigure 6

$$Q(x)\approx \frac{1}{x(1-(1/\pi))+(1/\pi)\sqrt{x^2+2\pi}}\frac{1}{\sqrt{2\pi}}e^{-x^2/2} \quad \text{[Math. 6]}$$

$B_M(H_k)$ of the Equation 4 has values $Q_{1,n}+Q_{2,n}$, $\frac{3}{8}(2Q_{1,n}+3Q_{2,n})$ and $\frac{1}{48}(28Q_{1,n}+49Q_{2,n})$ in modulation orders of QPSK, 16-QAM, and 64-QAM, respectively. $Q_{1,n}$ and $Q_{2,n}$ indicate a shift probability between neighboring symbols in which the first and second bits have different values.

$Q_{1,n}$ and $Q_{2,n}$ can be expressed as shown

MathFigure 7

$$Q_{1,n} = Q\left(\sqrt{\frac{|H|^2 6\sigma_s^2}{4\sigma_n^2(M-1)}}\right) \quad \text{[Math. 7]}$$

MathFigure 8

$$Q_{2,n} = Q\left(\sqrt{\frac{|H|^2 12\sigma_s^2}{4\sigma_n^2(M-1)}}\right) \quad \text{[Math. 8]}$$

where $\sigma_s$ indicates a signal variance, and $\sigma_n$ indicates a noise variance.

In the mobile communication system, channel environments may vary due to user mobility. In the case of a user having a great mobility, time delay occurs between a feedback channel and a data transmission channel, so that the performance of the AMC scheme can be degraded due to error between the two channels. It may be difficult to compensate for channel error due to time delay by using $Q_{1,n}$ and $Q_{2,n}$ according to the Equations 7 and 8 in which user mobility is not taken into consideration.

Hereinafter, a method of compensating for channel error due to user mobility is described. $Q_{1,n}$ and $Q_{2,n}$ are found by taking user mobility into consideration.

In a channel environment having user mobility, a channel model can be used as shown MathFigure 9

$$\tilde{H} = H - \Xi \quad [\text{Math.9}]$$

where $H=[H_1, H_2, \ldots, H_N]$ indicates a channel at the point of receiving at a transmitter, $\tilde{H}=[\tilde{H}_1, \tilde{H}_2, \ldots, \tilde{H}_N]$ indicates a channel at a point of time where the receiver transmits, and $\Xi=[\Xi_1, \Xi_2, \ldots, \Xi_N]$ indicates channel error between H and $\tilde{H}$ due to time delay during the feedback. The Equation 9 is a modeling of an OFDM channel at a point of time where data is transmitted in consideration of error occurring due to time delay between the feedback channel and the data transmission channel in a time-varying channel environment.

Channel error $\Xi$ can be modeled as a Gaussian vector having a covariance matrix of $(1-|\rho|^2)\sigma_h^2 I_N$, where $\sigma_h^2$ indicates an average energy of a channel and $\rho$ indicates a correlation coefficient between channels and can be obtained according to the well-known Jake's channel model. The channel correlation coefficient $\rho$ is a parameter, which is found using a Bessel function in consideration of a Doppler frequency $f_f$ and time delay $\tau_d$ in a time-varying channel environment, and can be expressed in $\rho=J_0(2\pi f_d \tau_d)$. $\rho$ indicates user mobility and a value thereof is smaller as user mobility increases. $\rho=1$ indicates complete channel information.

In accordance with the model of the Equation 9, a channel predicted in the receiver 200 is an error channel $\tilde{H}$ having a difference of $\Xi$ with an actual channel H at a next transmission point. Thus, when calculating $B_M(H_k)$ of the Equation 4 using the error channel, error is inevitably generated.

In the case that a channel is predicted to have a value greater than a real value, a MCS corresponding to a value greater than spectral efficiency that can be supported by an actual channel capacity is selected. This results in the loss of the frame error rate, leading to great performance degradation from the viewpoint of the transmission rate. To the contrary, in the case that a channel is predicted to have a value smaller than a real value, a MCS corresponding to a value smaller than spectral efficiency that can be supported by an actual channel capacity is selected. Likewise, the performance of the transmission rat is degraded.

In order to compensate for error due to channel error, $Q_{1,n}$ and $Q_{2,n}$ are obtained as shown MathFigure 10

$$Q_{1,n} = Q\left(\sqrt{\frac{|\tilde{H}_n|^2 6\sigma_s^2}{4\{\sigma_n^2 + (1-|\rho|^2)\sigma_s^2 \sigma_n^2\}(M-1)}}\right) \quad [\text{Math. 10}]$$

MathFigure 11

$$Q_{2,n} = Q\left(\sqrt{\frac{|\tilde{H}_n|^2 12\sigma_s^2}{4\{\sigma_n^2 + (1-|\rho|^2)\sigma_s^2 \sigma_n^2\}(M-1)}}\right) \quad [\text{Math. 11}]$$

In the $Q_{1,n}$ and $Q_{2,n}$ the channel coefficient of a numerator consists of components of $\tilde{H}$ according to the channel model of the Equation 9. In a denominator, a channel correlation coefficient, and functions of transmission power and noise power are set in order to compensate for user mobility.

The error rate is compensated for through the channel correlation coefficient in which not only the estimated channel information, but also the user mobility is taken into consideration. Accordingly, when deciding a MCS, channel error due to user mobility can be compensated for.

Furthermore, in a system to which the AMC scheme is applied, one of methods of compensating for the influence of channel error is to lower a received SNR to some extent when an algorithm for selecting a MCS is performed. In this method, the AMC scheme of a conservative type is performed by reducing the capacity of a channel to an actually predicted value or less. $Q_{1,n}$ and $Q_{2,n}$ of the Equations 10 and 11 can be expressed as shown MathFigure 12

$$Q_{1,n} = Q\left(\sqrt{\frac{|\tilde{H}_n|^2 6\sigma_{sn}^2}{4\{1 + (1-|\rho|^2)\sigma_{sn}^2\}(M-1)}}\right) \quad [\text{Math. 12}]$$

MathFigure 13

$$Q_{2,n} = Q\left(\sqrt{\frac{|\tilde{H}_n|^2 12\sigma_{sn}^2}{4\{1 + (1-|\rho|^2)\sigma_{sn}^2\}(M-1)}}\right) \quad [\text{Math. 13}]$$

where $\sigma_s$ is signal variance, $\sigma_n$ is noise variance and $\sigma_{sn} = \sigma_s/\sigma_n$. Thus, it can be said that $\sigma_{sn}$ is equivalent to the received SNR. That is, a constant performance can be obtained by taking both the channel correlation coefficient and the SNR into consideration when compensating for the error rate.

Meanwhile, the purpose of performing the AMC scheme is to maximize the system transmission rate while maintaining a constant level of the QoS by controlling the transmission rate according to a channel state. In the present invention, a MCS having the highest spectral efficiency is selected within a range to fulfill a predetermined QoS by calculating the error rate every moment on a MCS basis.

It is assumed that the MCS table supports a total of lmax MCS level. Each MCS index l ($l=1, \ldots, l_{max}$) is comprised of the code rate $R_C \in \{R_1, \ldots, R_v\}$ and the modulation order $\log_2 M_j \in \{1, \ldots, m_{max}\}$. Spectral efficiency supported by the MCS index l can be found using $R_T(l) = R_C \log_2 M_l$. The greater the spectral efficiency, the higher the transmission rate.

A MCS is selected to have the greatest spectral efficiency while maintaining a predicted error rate to a predetermined value or less. It can be expressed as shown MathFigure 14

$$\text{maximize } R_T(l) = R_C \log_2 M_l \quad [\text{Math.14}]$$

subject to $\overline{\text{BER}} \leq P_e$ where $P_e$ indicates the error rate necessary for a system. A MCS having the greatest spectral efficiency is selected under the condition that an obtained error rate is a threshold value $P_e$ by estimating the error rate of a stream every moment. In an embodiment, the receiver can predict the error rate and then feedback it to the transmitter. The transmitter selects a MCS through the feedback error rate. In another embodiment, the receiver can select a MCS through a predicted error rate and then feedback a MCS index to the transmitter.

In a channel environment of user mobility, some degree of performance can be guaranteed in the existing case where there is no mobility irrespective of the channel correlation coefficient and the received SNR value.

A simulation is calculated by a Monte-Carlo simulation, a MCS table used is the following Table 1, and a Rate Compatible Punctured Convolutional (RCPC) code of Table 2 is used.

TABLE 1

| | 1 | 2 | 3 | 4 | 5 | 6 |
|---|---|---|---|---|---|---|
| $R_T$ | 1 | 2 | 3 | 4 | 4.5 | 5 |
| $R_C$ | ½ | ½ | ¾ | ⅔ | ¾ | ⅚ |
| Modulation | QPSK | 16-QAM | 16-QAM | 64-QAM | 64-QAM | 64-QAM |

TABLE 2

| v | $R_C$ | $d_H$ | p | $Nv(d), d = d_H, \ldots, d_H + 5$ |
|---|---|---|---|---|
| 1 | ½ | 10 | 3 | 108, 0, 633, 0, 4212, 0 |
| 2 | ⅔ | 6 | 2 | 3, 70, 285, 1276, 6160, 27128 |
| 3 | ¾ | 5 | 3 | 42, 201, 1492, 10469, 62935, 379546 |
| 4 | ⅚ | 4 | 5 | 92, 528, 8694, 79453, 791795, 7369828 |

It is assumed that each channel has an independent Rayleigh fading channel and an indoor channel model has a 5-tap power delay profile having an exponentially decreasing fading characteristic. This channel has Root Mean Square (RMS) delay spreading of approximately 100 ns. It is assumed that when the AMC is applied, the QoS required in the system is the bit error rate of 0.1%.

Figure 4:
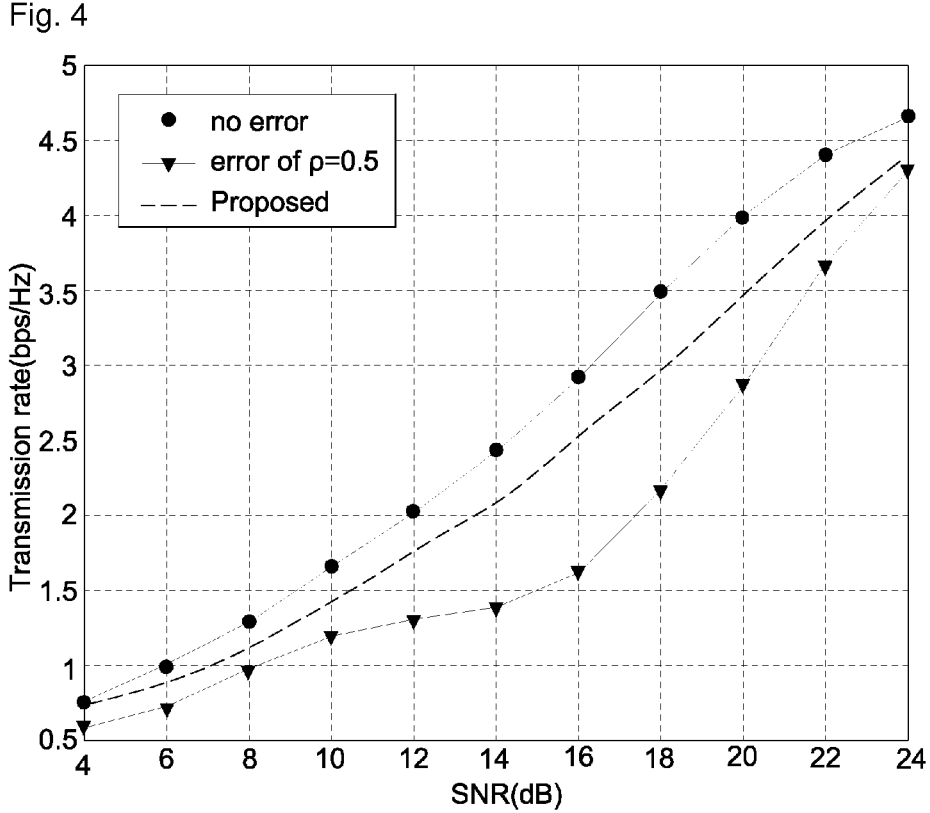
FIG. 4 is a graph showing the transmission rate versus the SNR according to a simulation result.

FIG. 4 is a graph showing the transmission rate versus the SNR according to a simulation result.

Referring to FIG. 4, in an environment where the channel correlation coefficient corresponds to 0.5 (ρ=0.5), a system by the conventional technique experiences degradation of the transmission rate of 50% or more. However, according to the present invention, it can be confirmed that the performance is compensated for up to approximately 70%-80% of a total transmission rate. Furthermore, a constant performance is maintained in the entire SNR.

Figure 5:
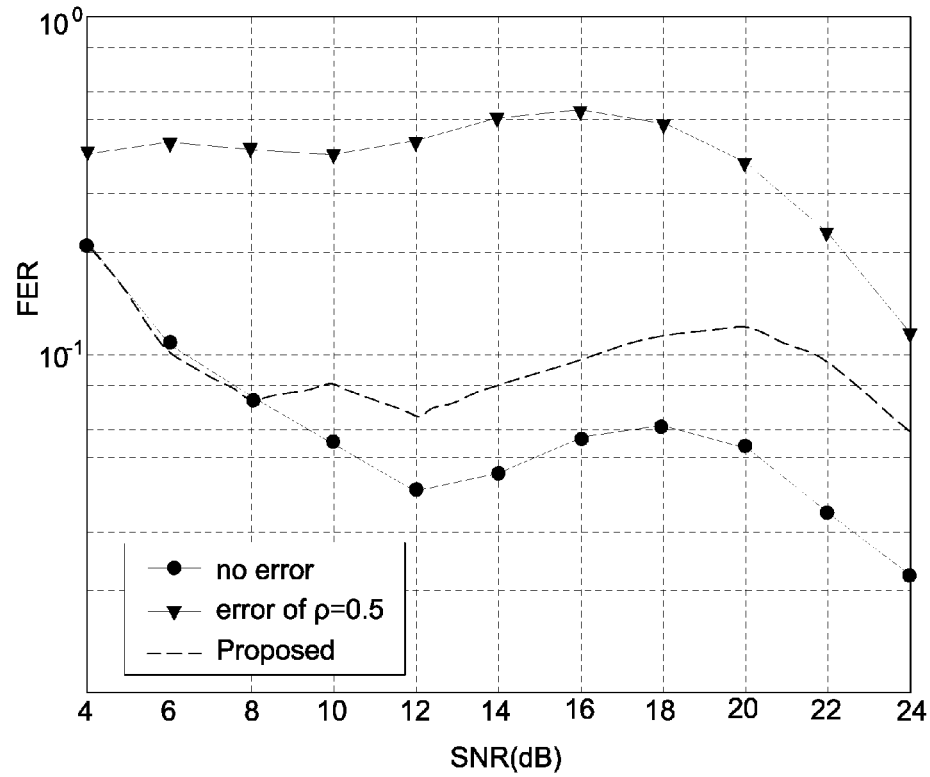
FIG. 5 is a graph showing the FER versus the SNR according to a simulation result.

FIG. 5 is a graph showing the FER versus the SNR according to a simulation result.

Referring to FIG. 5, in the case of the conventional technique, severe performance degradation occurs. The FER is increased up to 40% to 50%. This corresponds to a performance, which cannot support not only data communication, but also even a voice communication system. However, if the channel error compensation scheme according to the present invention is applied, it can be confirmed that the FER is recovered substantially.

Hereinafter, a method of determining a MCS and a user scheduling method in a multi-antenna system are described.

Figure 6:
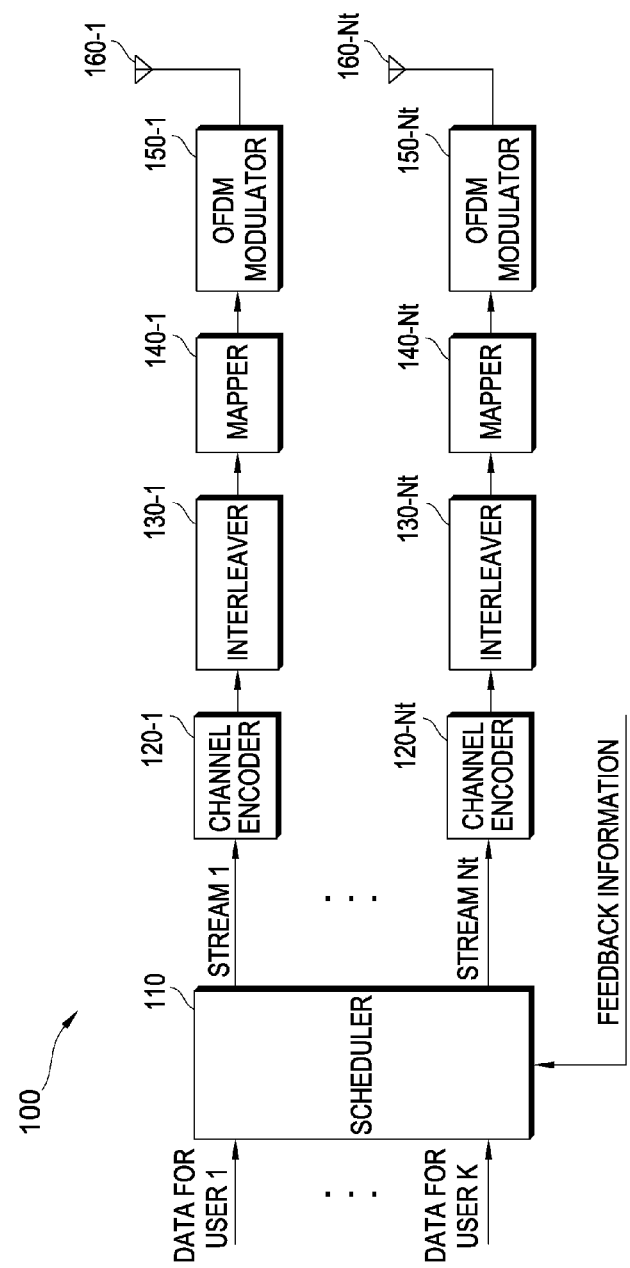
FIG. 6 is a block diagram of a transmitter according to an embodiment of the present invention.

FIG. 6 is a block diagram of a transmitter according to an embodiment of the present invention.

Referring to FIG. 6, a transmitter 400 includes a scheduler 410, channel encoders 420-1, . . . , 420-Nt, interleavers 430-1, . . . , 430-Nt, mappers 440-1, . . . , 440-Nt, and OFDM modulators 450-1, . . . , 450-Nt.

The scheduler 410 receives data with respect to K users and rearranges the data in Nt streams according to a scheduling method. K is the number of the users, and Nt is the number of transmit antennas 460-1, . . . , 460-Nt. The entire users cannot use resources at the same time due to problems such as the number of predetermined transmit antennas and transmission power. The scheduler 410 selects an appropriate user in order to increase a multi-user diversity gain for the MIMO system and changes it to a stream. Furthermore, the scheduler 410 receives feedback information from the receiver (500 of FIG. 7), determines MCSs with respect to the respective streams, and transfers them to the channel encoders 420-1, . . . , 420-Nt and the mappers 440-1, . . . , 440-Nt, so that the streams are modulated and coded according to a predetermined coding scheme and a predetermined modulation scheme. A method of allowing the scheduler 410 to determine a MCS level and scheduling user data is described later on.

The channel encoders 420-1, . . . , 420-Nt receive the streams, encode the streams according to a coding scheme decided by the scheduler 410, and thus form coded data. The interleavers 430-1, . . . , 430-Nt interleave the coded data in order to reduce a noise effect coming from the channels. The mappers 440-1, . . . , 440-Nt modulate the interleaved coded data according to a modulation scheme decided by the scheduler 410, and provides modulation symbols. The OFDM modulators 450-1, . . . , 450-Nt transform input symbols into OFDM symbols. The OFDM modulators 450-1, . . . , 450-Nt can transform the input symbols into time region samples by performing IFFT on the input symbols. The OFDM symbols output from the OFDM modulators 450-1, . . . , 450-Nt are converted into analog signals and then transmitted through the antennas 460-1, . . . , 460-Nt.

Figure 7:
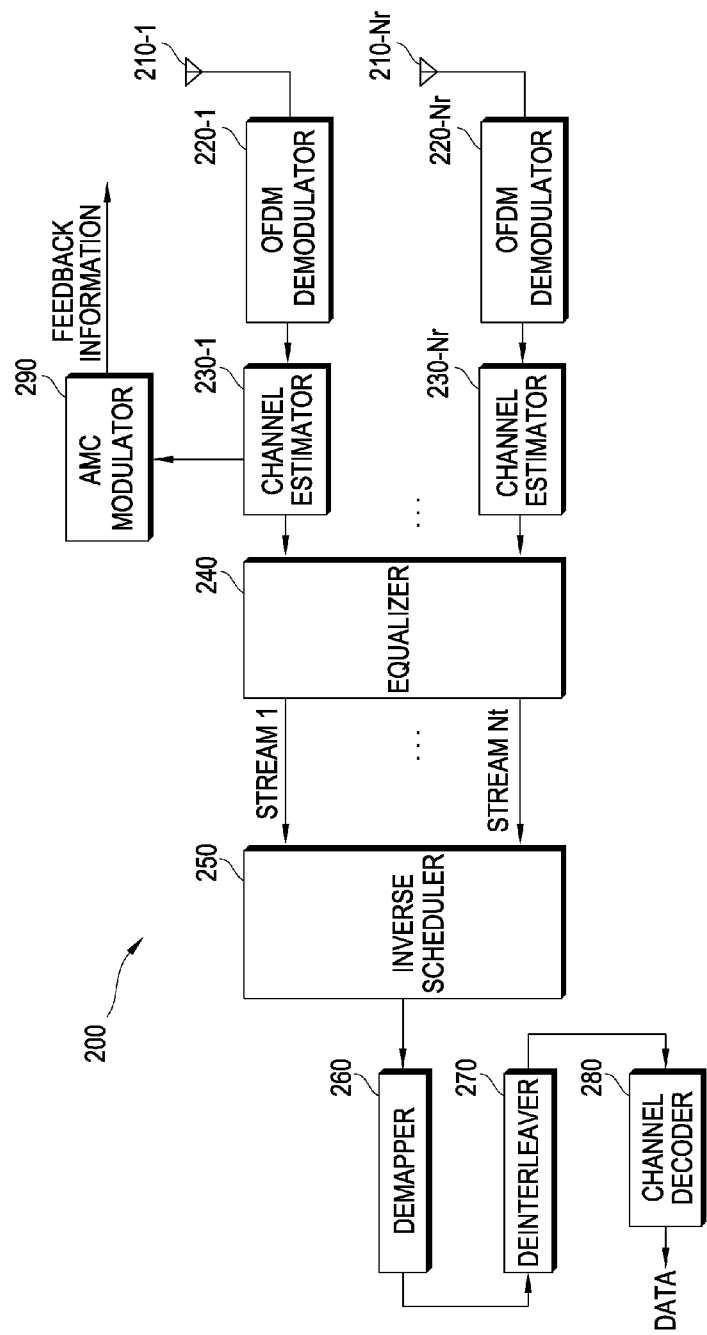
FIG. 7 is a block diagram of a receiver according to an embodiment of the present invention the receiver.

FIG. 7 is a block diagram of a receiver according to an embodiment of the present invention the receiver.

Referring to FIG. 7, a receiver 500 includes OFDM demodulators 520-1, . . . , 520-Nr, channel estimators 530-1, . . . , 530-Nr, an equalizer, 540-1, an inverse scheduler 550, a demapper 560, a deinterleaver 570, a channel decoder 580, and an AMC controller 590. In this case, Nr is the number of the receive antennas 510-1, . . . , 510-Nr.

Signals received from the receive antennas 510-1, . . . , 510-Nr are digitalized and then converted into symbols of a frequency region by the OFDM demodulators 520-1, . . . , 520-Nr. The channel estimators 530-1, . . . , 530-Nr estimate channel information. The equalizers 540-1, . . . , 540-Nr equalize the symbols using the estimated channel information. The inverse scheduler 550 extracts corresponding user streams from the input signals. The demapper 560, the deinterleaver 570, and the channel decoder 580 correspond to the channel encoders 420-1, . . . , 420-Nt, the interleavers 430-1, . . . , 430-Nt, and the mappers 440-1, . . . , 440-Nt of the transmitter 400, respectively, with respect to corresponding streams.

The AMC controller 590 receives an estimated channel quality from the channel estimators 530-1, . . . , 530-Nr, converts it into feedback information, which is a predetermined format between the AMC controller 590 and the scheduler 410, and then sends the result to the transmitter 400.

A method of determining a MCS and a user scheduling method according to an embodiment of the present invention are described below. The AMC scheme employing a determined MCS is configured to adaptively control the transmission rate and/or the power level with respect to each user according to feedback information.

Hereinafter, it is assumed that the MIMO channels are not related to each other spatially and the number Nr of the receive antennas is identical to the number Nt of the transmit antennas.

A total of Nt streams are separated at the output of the equalizer of the receiver. It is assumed that a user data sequence transmitted through an ith antenna is an ith stream. It is also assumed that a channel state is static during one pack transmission, respective transmissions undergo different channel states, and a feedback channel has not error.

Assuming that the CP is longer than the channel delay spreading, an output $r_n$ of an n-th subcarrier at a j-th receive antenna at each time slot after FFT is performed is expressed as shown MathFigure 15

$$r_n = \begin{bmatrix} r_1^n \\ \vdots \\ r_{N_r}^n \end{bmatrix}$$
$$= H_n x_n + z_n$$
$$= \begin{bmatrix} H_{11}^n & \cdots & H_{N_t 1}^n \\ \vdots & \ddots & \vdots \\ H_{1N_r}^n & \cdots & H_{N_t N_r}^n \end{bmatrix} \begin{bmatrix} x_1^n \\ \vdots \\ x_{N_t}^n \end{bmatrix} + \begin{bmatrix} z_1^n \\ \vdots \\ z_{N_r}^n \end{bmatrix}$$ [Math. 15]

where $H_{ij}^n$ indicates a channel frequency response between the i-th transmit antenna and the j-th receive antenna in the n-th subcarrier, $z_j^n$ indicates complex additive Gaussian noise, which has a variance a $\sigma_z^2$ per complex dimension and is independent and identically distributed, and $x_i^n$ indicates a transmission symbol at the i-th transmit antenna having a variance $\sigma_s^2$. It is assumed that a total power P of $x_n$ is $Nt\sigma_s^2$ and is identically distributed over the Nt transmit antennas.

Assuming that the channel impulse response is a time invariant during transmission, it can be said that the channel frequency response of a received signal is $$H_{ij}^n = \sum_{l=1}^{L} \bar{h}_{ij}(l) \exp(-j2\pi nl/N) \bar{h}_{ij}(l)$$

is a time domain channel impulse response at a first tap from the i-th transmit antenna to the j-th receive antenna and is independent in complex Gaussian having a zero mean.

The receiver detects Nt transmit signals from the received signals according to an equalizer matrix $W_n$. In other words, after the equalizer is applied in the receiver, the output $y_n = [y_n^1, \ldots, y_n^{N_t}]^T$ at the n-th subcarrier can be expressed as shown MathFigure 16

$$y_n = W_n r_n = W_n(H_n x_n + z_n)$$ [Math.16]

Assuming that $w_{n,i}$ is an i-th row of Wn and $h_{n,i}$ is an i-th column of $H_n$, the output of the i-th stream can be expressed as shown MathFigure 17

$$y_n^i = w_{n,i} h_{n,i} x_n^i + \sum_{r=1, r \neq i}^{N_t} w_{n,r} h_{n,r} x_n^r + w_{n,i} z_n$$ [Math. 17]

where the last two factors indicate interference and noise having a total variance $\sigma_{w,t}^2$.

The total variance $\sigma_{w,t}^2$ can be expressed as shown

MathFigure 18

$$\sigma_{w,i}^2 = \sum_{r=1, r \neq i}^{N_t} \|w_{n,r} h_{n,r}\|^2 \sigma_s^2 + \|w_{n,i}\|^2 \sigma_z^2$$ [Math. 18]

Accordingly, a Signal to Interference plus Noise Ratio (SINR) at the output of the equalizer with respect to the i-th stream at the n-th subcarrier can be expressed as shown MathFigure 19

$$SINR_{n,i} = \frac{\|w_{n,i} h_{n,i}\|^2 \sigma_s^2}{\sigma_{w,i}^2} \equiv \rho_{n,i}$$ [Math. 19]

Meanwhile, in an equalization method of the equalizer, two kinds of linear equalizers, including a Zero-Forcing Equalizer (ZFE) or a Minimum Mean Square Error Equalizer (MMSE), can be considered.

The ZFE uses channel inverse transform in order to remove interference from other streams. In accordance with the ZFE method, an equalizer matrix $W_n^{ZFE}$ can be expressed as shown MathFigure 20

$$W_n^{ZFE} = (H_n^H H_n)^{-1} H_n^H$$ [Math.20]

where $(.)^H$ indicates Hermitian transpose.

A MMSE equalizer matrix $W_n^{MMSE}$ can be expressed as shown

MathFigure 21

$$W_n^{MMSE} = \left( H_n^H H_n + \frac{\sigma_n^2}{\sigma_s^2} I_{N_t} \right)^{-1} H_n^H$$ [Math. 21]

where $I_{Nt}$ indicates Nt×Nt identity matrix. The ZFE is simple, but may experience a noise increase. Thus, the MMSE may have generally better performance.

A method of determining a MCS is described below.

The user data streams transmitted through the multi-transmit antenna from the transmitter are selected by the scheduler. The scheduler determines a MCS according to a criterion decided with respect to each stream.

The respective streams by the scheduler pass through the channel encoder and the mapper. Hereinafter, Rc indicates the code rate and dH indicates the minimum Hamming distance. The channel encoder adopts Rate Compatible Punctured Convolutional Codes (RCPC), and a higher code rate is punctured from a mother code, that is, the code rate ½ according to the puncturing period p. Assuming that the SINR vector is $\Omega_i = [\rho_{1,i}, \ldots, \rho_{N,i}]$, the instant error rate of the i-th stream can be estimated as shown MathFigure 22

$$BER_i = \frac{1}{p} \sum_{d=d_H}^{d_H + 5} N(d) P(d, \Omega_i)$$ [Math. 22]

where N(d) indicates a total input weight of an error event at the Hamming distance d, and $P(d,\Omega_i)$ indicates a mean codeword PEP between codewords at the Hamming distance d.

The error rate refers to channel error with respect to a symbol. Hereinafter, in order to more clarify the description, the error rate is referred to as the bit error rate. Those having ordinary skill in the art can easily change the error rate to other forms such as a Frame Error Rate (FER) or Block Error Rate (BLEB).

In the event that the channel is modeled as Rayleigh or Rician distributions in a single carrier system, $P(d,\Omega_i)$ can be calculated accurately.

A MCS level can be determined by estimating instant error rate of the symbol with respect to each the transmit antenna. The error rate can be estimated not on the entire subchannels, but on the OFDM symbol. However, in the OFDM-based mobile communication system, $P(d,_{\Omega i})$ may be very difficult to calculate accurately due to the frequency selectivity of the channel. A method of estimating the error rate in order to calculate the error rate of the Equation 22 is described below.

$P(d,\Omega_i)$ can be found as follows with respect to the SINR vector $\Omega_i$ for each stream.

*MathFigure 23*

$$P(d, \Omega_i) \leq \frac{1}{m^d} \sum_{S} \prod_{k=1}^{d} \frac{1}{2^{m-1}} \sum_{x_k \in \chi_0^{jk}} \sum_{v_k \in \chi_1^{jk}} P(x_k \to v_k \mid \rho_{nk,i}) \equiv \overline{B}_{M,i} \quad [\text{Math. 23}]$$

where S indicates a Cartesian product between d bit positions and $\overline{\chi}_b^j$ indicates a partial collection of signal points at the m-QAM constellation where the j-th bit is b, where $m = \log_2 M$.

Assuming ideal interleaving and gray mapping, the Equation 23 can be expressed as shown

*MathFigure 24*

$$\overline{B}_{M,i} = \prod_{k=1}^{d} E_{\rho_{k,i}} \left[ \frac{1}{m2^{m-1}} \sum_{j=1}^{m} \sum_{x_k \in \chi_0^{jk}} \sum_{v_k \in \chi_1^{jk}} P(x_k \to v_k \mid \rho_{k,i}) \right] \quad [\text{Math. 24}]$$

$$= \left\{ \frac{1}{N} \sum_{k=1}^{N} \frac{1}{m2^{m-1}} \sum_{j=1}^{m} \sum_{x_k \in \chi_0^{jk}} \sum_{v_k \in \chi_1^{jk}} P(x_k \to v_k \mid \rho_{k,i}) \right\}^d$$

$$\equiv \left\{ \frac{1}{N} \sum_{k=1}^{N} B_M(\rho_{k,i}) \right\}^d$$

In calculating the above equation, most error events are caused by erroneous determination of $v_k$, that is, neighboring points of $x_k$. The neighboring points $v_k$ have the j-th bit different from that of $x_k$.

Figure 8:
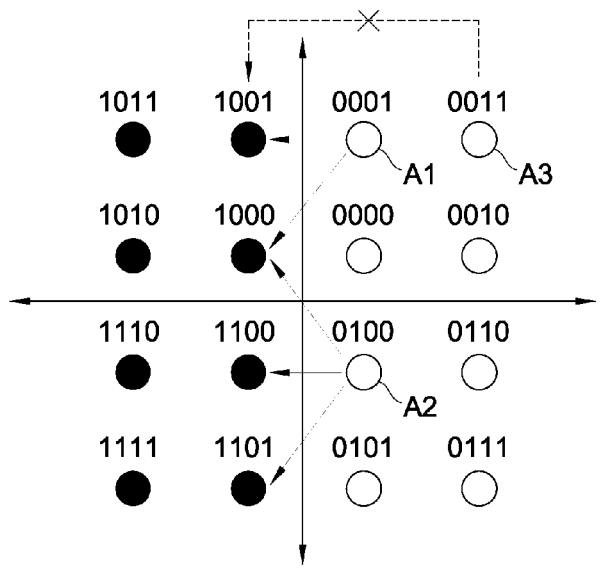
FIG. 8 is an exemplary view illustrating neighboring points in 16-QAM.

FIG. 8 is an exemplary view illustrating neighboring points in 16-QAM. j=1 and dark points indicate points where the first bit position is 1.

Referring to FIG. 8, there are three kinds of transitions that characterize respective error events. A point A1 has two neighboring points whose first bit positions are different. A point A2 has three neighboring points whose first bit positions are different. On the other hand, a point A3 does not have neighboring points whose first bit positions are different. In the case of j=1 and 2, points similar to the point A3 are four in number, and in the case of j=3 and 4, there are no points similar to the point A3.

$Q_1$ and $Q_2$ are respectively defined as shown

*MathFigure 25*

$$Q_1 = Q\left(\sqrt{\frac{1.5\rho_{n,i}}{M-1}}\right) \quad [\text{Math. 25}]$$

$$Q_2 = Q\left(\sqrt{\frac{3\rho_{n,i}}{M-1}}\right)$$

$B_M(\sigma_n)$ with respect to 16-QAM can be found by $3(2Q_1 + 3Q_2)/8$ when considering for all j. When defining Q(x) as $$\frac{1}{\sqrt{2\pi}} \int_x^\infty e^{-2z^1/2} dz,$$

it can be simplified as shown

*MathFigure 26*

$$Q(x) \approx \frac{1}{x(1-(1/\pi)) + (1/\pi)\sqrt{x^2 + 2\pi}} \frac{1}{\sqrt{2\pi}} e^{-x^2/2} \quad [\text{Math. 26}]$$

$B_M(\sigma_{n,i})$ with respect to QPSK and 64-QAM can also be found by $Q_1 + Q_2$ and $(28Q_1 + 49Q_2)/48$. In other words, $B_M(\sigma_{n,i})$ can be easily calculated as a function of $\rho_{n,i}$, and the error rate can also be simply calculated.

In each transmission, the transmission rate is selected from the AMC table to define a MCS according to each MCS level. That is, the transmission rate is determined according to a selected modulation scheme and coding scheme.

It is assumed that a k-th user sends a data stream through the i-th transmit antenna and the AMC table supports a total of $1_{max}$ MCS levels. It is also assumed that the respective MCS levels l (l=1, ..., $1_{max}$) consists of a $M_l$-QAM signal collection, that is, the code rate $R_C \in \{R_1, ..., R_V\}$ and the order $\log_2 M_l \in \{1, ..., m_{max}\}$.

The spectral efficiency supported by the MCS level l can be found by $R_T(l) = R_C \log_2 M_l$. The greater the spectral efficiency, the higher the transmission rate. With respect to a predetermined SINR vector $\Omega_i$, a cost function with respect to the spectral efficiency $R_T(l)$ can be defined as shown

*MathFigure 27*

$$\overline{BER}(\Omega_i, l) = \frac{1}{p_l} \sum_{d=d_H}^{d_H+5} N_l(d) Q\left(\sqrt{-2\log \overline{B}_{M,i}}\right) \quad [\text{Math. 27}]$$

where $p_l$ is the puncturing period of a code.

The Equation 27 is a formula for estimating the error rate and can be used to determine a MCS. The error rate can be calculated in the receiver through channel quality information and be then sent to the transmitter as feedback information.

Alternatively, the error rate can be calculated in the transmitter that has received the channel quality information.

The following method is possible in order to determine the MCS level using the error rate.

An embodiment is a bit error rate (BER) constraint method, which determines a MCS under the error rate constraint. In this case, the AMC method can be used to determine the transmission rate according to a current channel state while maintaining the error rate to a required error level or less. That is, the BER constraint method can be expressed as shown MathFigure 28

$$\text{maximize } R_T(l) = R_C \log_2 M_l \quad \text{[Math.28]}$$

subject to $\overline{BER}(\Omega_i, l) \leq P_e$ where $P_e$ refers to a required error rate. That is, in the BER constraint method, the error rate of each stream every moment is estimated, and a MCS having the greatest spectral efficiency under the limited $P_e$ where the estimated error rate is the threshold value is selected. The transmission rate can become a maximum while maintaining the error rate to the threshold value or less. It can be said that this method is suitable for transmission requiring reliability, such as collision control in the Internet Protocol (IP) layer.

Another embodiment is a rate maximizing method of maximizing a total throughput irrespective of the mean error rate in the receiver. For the purpose of the rate maximizing method, there is a need for another cost function to represent an expected throughput in the receiver. The expected throughput can be found as follow through the Equation 27.

MathFigure 29

$$R_i(\Omega_i, l) = R_C \log_2 M_l (1 - \overline{BER}(\Omega_i, l)) \quad \text{[Math.29]}$$

The MCS level for packet transmission is determined to optimize the expected throughput $R_i(\Omega_i, l)$. The MCS level can be determined such that the throughput including the error rate can be maximized, thus maximizing the transmission rate. It can be said that this method is appropriate for high-speed transmission such as World Wide Web (WWW) or File Transfer Protocol (FTP).

A user scheduling method according to an embodiment of the present invention is described below. A multi-user environment employing a multi-user diversity is taken into consideration. A multi-user diversity gain can be increased according to the number of users who gain access to the base station at the same time.

It is assumed that the channel state, such as the received SNR, is identical with respect to the entire users. It is also assumed that K users gain access to the base station and each user has sufficient data streams in the waiting queue. It is assumed that the transmission rate supported in the i-th transmit antenna with respect to the users k (k=1, . . . , K) is $R_{k,i}$. The transmission rate is determined according to a selected MCS.

In an embodiment, the base station can select a user having the highest $R_{k,i}(1-\overline{BER}_{k,i})$ of the transmission rates, which are reported from the entire users with respect to the i-th transmit antenna. A user having the maximum transmission rate per transmit-antenna basis is selected and a MCS level is determined based on the selected result, thus increasing the multi-user diversity gain.

In another embodiment, the base station can select a user having the maximum value of $R_k/R_{avg,k}$, where $R_k$ indicates $\max_i R_{k,i}(1-\overline{BER}_{k,i})$ and $R_{avg,k}$ is a moving average of the data rate, which is provided to a user in a previous time slot. It can provide an approximately same number of time slots to the entire users, but can allocate transmission to a user having the best channel state. This method can be more suitable for a time selective environment with great user mobility.

The sum of the transmission rates $Nt \cdot R_{k,i}$ and $N_t \cdot \overline{BER}_{k,i}$ can be calculated on the user equipment and then sent to the base station. That is, the transmission rate and the error rate are calculated in the receiver and then feedback to the transmitter in order to reduce the amount of feedback information. If sufficient users request packet transmission at the same time, at least one user who wants to send a packet in each antenna may exist. In this case, the amount of feedback information can be reduced by reporting only the maximum value of $R_{k,i}(1-\overline{BER}_{k,i})$ according to a selected antenna.

Figure 9:
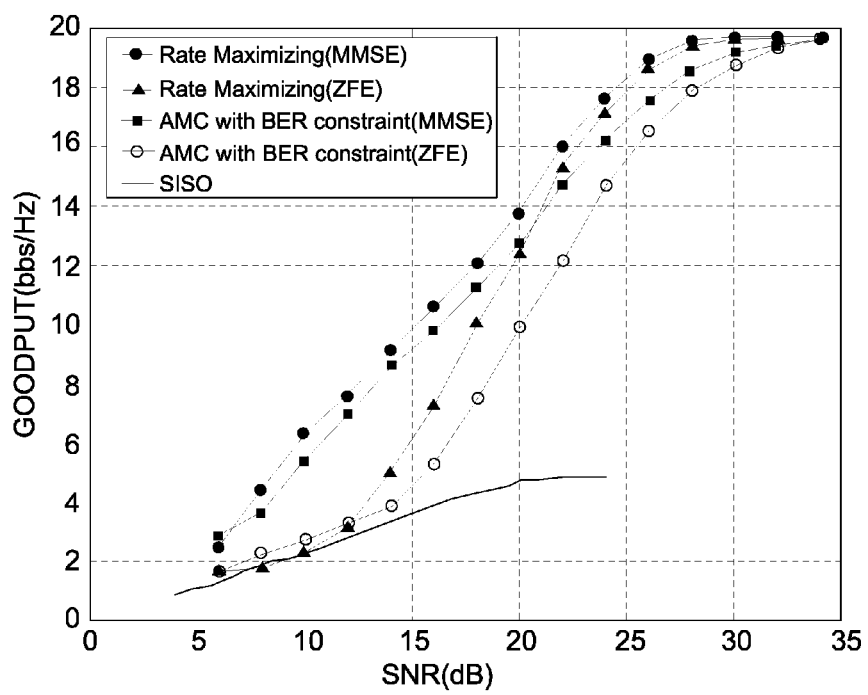
FIG. 9 is a graph showing goodput versus SNR according to a simulation result.

FIG. 9 is a graph showing goodput versus SNR according to a simulation result. It is assumed that Nt=Nr=4 and K=20 users want to send packets at the same time. An OFDM system having N=64 subcarriers and the CP length of 16 samples is taken into consideration. It is assumed that the entire users have an exponentially decreasing channel profile of a 5-tap and a total transmission power P is 2. The AMC table used in a simulation is like the following Table 3.

TABLE 3

| l | $R_T(l)$ | $R_C$ | Modulation |
|---|----------|-------|------------|
| 1 | 0.75 bps/Hz | 3/4 | BPSK |
| 2 | 1 bps/Hz | 1/2 | QPSK |
| 3 | 1.5 bps/Hz | 3/4 | QPSK |
| 4 | 2 bps/Hz | 1/2 | 16-QAM |
| 5 | 2.5 bps/Hz | 5/8 | 16-QAM |
| 6 | 3 bps/Hz | 3/4 | 16-QAM |
| 7 | 3.5 bps/Hz | 7/12 | 64-QAM |
| 8 | 4 bps/Hz | 2/3 | 64-QAM |
| 9 | 4.5 bps/Hz | 3/4 | 64-QAM |
| 10 | 5 bps/Hz | 5/6 | 64-QAM |

In channel coding, a 16-state punctured convolutional code is adopted. In order to measure a system throughput, transmission of 10000 frames or more is simulated. Furthermore, an automatic repeat request is implemented along with the AMC method. In order to measure the performance of the AMC method, goodput is adopted. The gooput is to count information bits in a decided frame having an accurate Cyclic Redundancy Check (CRC).

Referring to FIG. 9, a Single Input Single Output (SISO) system is the case where not the linear equalizer, but the maximum likelihood demapper is used. As the SNR increases, the method according to the present invention shows better performance and performance gain than those of the SISO system.

The rate maximizing method shows the highest transmission rate though it does not satisfy a required mean error rate. In either the BER constraint method or the rate maximizing method, the MMSE has better performance than the ZFE. In the ZFE, the SINR calculated at the output of the equalizer is degraded due to noise amplification, and the AMC method determines a MCS level using the function of the SINR. Thus, the transmission rate selected by the ZFE is generally lower than the transmission rate by the MMSE.

In general, a SNR that is required to increase the spectral efficiency while fulfilling the error rate constraint increases as a desired spectral efficiency increases. It further lowers an expected error rate of the MCS level under the error rate constraint at higher spectral efficiency than a necessary error rate. In a high spectral efficiency region, the rate maximizing method can improve the throughput by taking only the expected throughput of the AMC collection into consideration.

As shown in the graph, the performance difference between the two kinds of determination methods is great in a region where the maximum possible transmission rate is about 90%. In other words, the performance difference may be greater in a lower spectral efficiency region. Furthermore, the ZFE requires a higher SNR in order to select greater spectral efficiency. Accordingly, the MMSE can have better performance by adopting the rate maximizing method.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of determining a modulation and coding scheme, the method comprising:
   predicting an error rate of a symbol with respect to each of a plurality of modulation and coding scheme levels, by using a channel model which includes a factor for compensating an error caused by time delay between a feedback channel and a data transmission channel due to user mobility; and
   determining a modulation and coding scheme based on the predicted error rate,
   wherein the modulation and coding scheme is determined so that spectral efficiency is maximized while maintaining the error rate to a predetermined value or less,
   wherein the modulation and coding scheme is derived by a reduced signal or noise ratio, and
   wherein the spectral efficiency is found by $R_T = R_C \log_2 M_i$, where $R_T$ is the spectral efficiency, $R_C$ is the code rate and M is a modulation order.

2. The method of claim 1, wherein the channel model is modeled as $\overline{H} = H + \Xi$, where $H = [H_1, H_2, \ldots, H_N]$ indicates the feedback channel fed back from a transmitter, $\overline{H} = [\overline{H}_1, \overline{H}_2, \ldots, \overline{H}_N]$ indicates the data transmission channel at a point of time where the receiver transmits, and $\Xi = [\Xi_1, \Xi_2, \ldots, \Xi_N]$ indicates a channel error between H and $\overline{H}$ due to the time delay during a feedback.

3. A method of determining a modulation and coding scheme, the method comprising:
   predicting an error rate of a symbol with respect to each predetermined modulation and coding scheme by employing a channel correlation coefficient considering user mobility; and
   selecting a modulation and coding scheme having the maximum spectral efficiency with respect to the error rate,
   wherein the error rate of the symbol is derived by using a channel model including a factor for compensating an error caused by time delay between a feedback channel and a data transmission channel due to user mobility,
   wherein the error rate is found as $$\overline{BER} = \frac{1}{p} \sum_{d=d_H}^{d_H+5} N(d) P(d, H),$$

where p is a puncturing period, $d_H$ is a minimum Hamming distance of a code, N(d) is a total number of error events having the Hamming distance d and P(d,H) is a pairwise error probability between codewords at the Hamming distance d, and P(d,H) is compensated through the channel correlation coefficient, and
   wherein the channel correlation coefficient $\rho$ is found as $\rho = J_0(2\pi f_d \tau_d)$ by employing a Bessel function in consideration of a doppler frequency $f_d$ and time delay $\tau_d$.

4. The method of claim 3, wherein the channel model is modeled as $\overline{H} = H + \Xi$, where $H = [H_1, H_2, \ldots, H_N]$ indicates the feedback channel fed back from a transmitter, $\overline{H} = [\overline{H}_1, \overline{H}_2, \ldots, \overline{H}_N]$ indicates the data transmission channel at a point of time where the receiver transmits, and $\Xi = [\Xi_1, \Xi_2, \ldots, \Xi_N]$ indicates a channel error between H and $\overline{H}$ due to the time delay during a feedback.

5. A method of scheduling a plurality of user data, the method comprising:
   obtaining a transmission rate and an error rate supported for a plurality of transmit antennas;
   selecting user data by using the error rate and the transmission rate; and
   modulating and coding the user data based on a modulation and coding scheme decided according to the transmission rate; and
   transmitting the user data,
   wherein the error rate of the symbol is derived by using a channel model including a factor for compensating an error caused by time delay between a feedback channel and a data transmission channel due to user mobility, and
   wherein the channel model is modeled as $\overline{H} = H + \Xi$, where $H = [H_1, H_2, \ldots, H_N]$ indicates the feedback channel fed back from a transmitter, $\overline{H} = [\overline{H}_1, \overline{H}_2, \ldots, \overline{H}_N]$ indicates the data transmission channel at a point of time where the receiver transmits, and $\Xi = [\Xi_1, \Xi_2, \ldots, \Xi_N]$ indicates a channel error between H and $\overline{H}$ due to the time delay during a feedback.

6. A wireless device configured to determine a modulation and coding scheme, the wireless device comprising an adaptive modulation coding controller configured to:
   predict an error rate of a symbol with respect to each predetermined modulation and coding scheme by employing a channel correlation coefficient considering user mobility; and
   select a modulation and coding scheme having the maximum spectral efficiency with respect to the error rate,
   wherein the error rate of the symbol is derived by using a channel model including a factor for compensating an error caused by time delay between a feedback channel and a data transmission channel due to user mobility, and
   wherein the channel model is modeled as $\overline{H} = H + \Xi$, where $H = [H_1, H_2, \ldots, H_N]$ indicates the feedback channel fed back from a transmitter, $\overline{H} = [\overline{H}_1, \overline{H}_2, \ldots, \overline{H}_N]$ indicates the data transmission channel at a point of time where the receiver transmits, and $\Xi=[\Xi_1, \Xi_2, \ldots, \Xi_N]$ indicates a channel error between H and $\bar{H}$ due to the time delay during a feedback.

7. The wireless device of claim 6, wherein the modulation and coding scheme is determined so that spectral efficiency is maximized while maintaining the error rate to a predetermined value or less, and wherein the modulation and coding scheme is derived by a reduced signal to noise ratio.

* * * * *